Figure 1:
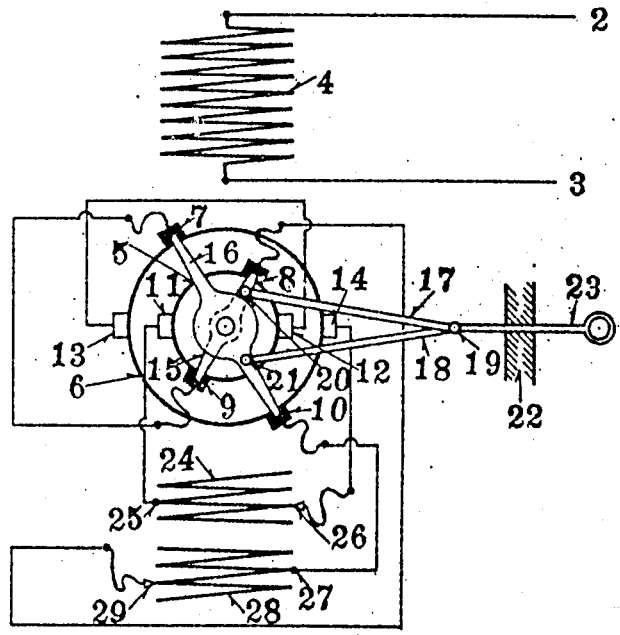

V. A. FYNN.
ALTERNATING CURRENT MOTOR.
APPLICATION FILED DEC. 15, 1916.

1,248,474.

Patented Dec. 4, 1917.

INVENTOR
Valère A. Fynn
BY
E. E. Huffman
ATTORNEY

UNITED STATES PATENT OFFICE.

VALERÈ A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,248,474.     Specification of Letters Patent.     Patented Dec. 4, 1917.

Application filed December 15, 1916. Serial No. 137,104.

*To all whom it may concern:*

Be it known that I, VALERÈ A. FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to single-phase alternating current motors and is particularly applicable to machines of this type in which at least a part of the total energy utilized in the rotor is conveyed to it by induction.

It is the purpose of my invention to provide simple means for adjusting the speed of such motors.

In carrying out my invention in connection with a motor having a shunt characteristic, I provide the induced member with two working and one exciting circuit, cross the axes of the working circuits, connect them in series or in parallel, conductively impress an E. M. F. on the working circuits and provide means for displacing their axes. I prefer to dispose the working axes symmetrically with respect to the axis of the magnetization produced by the inducing member and to displace them in opposite directions and by equal amounts for the purpose of regulation. In one form of my improved motor I provide the induced member with two independent commuted windings, and also with one set of stationary exciting and two sets of movable working brushes. I dispose the stationary brushes along the motor field axis, or that which is usually displaced by about 90 electrical degrees with respect to the axis of the main inducing winding on the primary. These exciting brushes preferably coöperate with both commuted windings connecting them in series along the motor field axis, but they can also be made to connect said windings in parallel in case the windings are identical in every respect and stand in the same inductive relation with respect to the inducing winding. It is however sufficient to use only one of these windings for producing the motor field. The exciting brushes can be directly interconnected, or if it is desired to compensate the machine then a compensating E. M. F. must be introduced into the motor field circuit. The two sets of working brushes are so arranged that each set can be made to close the induced member along the axis of the magnetization produced by the inducing member, or along an axis displaced therefrom by some angle smaller than 90 electrical degrees. One set of brushes coöperates with one commuted winding and the other set with the other commuted winding. These two windings are preferably connected in series by means of the working brushes, but, if they are identical in every respect and stand in the same inductive relation with respect to the inducing member, then they can also be connected in parallel. The two sets of brushes can be so moved as to cause the axis of each set to coincide with the axis of the magnetization produced by the inducing member, or to be displaced therefrom in opposite directions and to equal amounts.

In another form I provide the induced member with but one commuted winding, one set of exciting brushes displaced by about 90 electrical degrees from the axis of the magnetization produced by the inducing member, and two sets of movable working brushes arranged as in the first example, but both coöperating with this one commuted winding. I connect these two sets in series relation by means of a series transformer.

Figure 2:
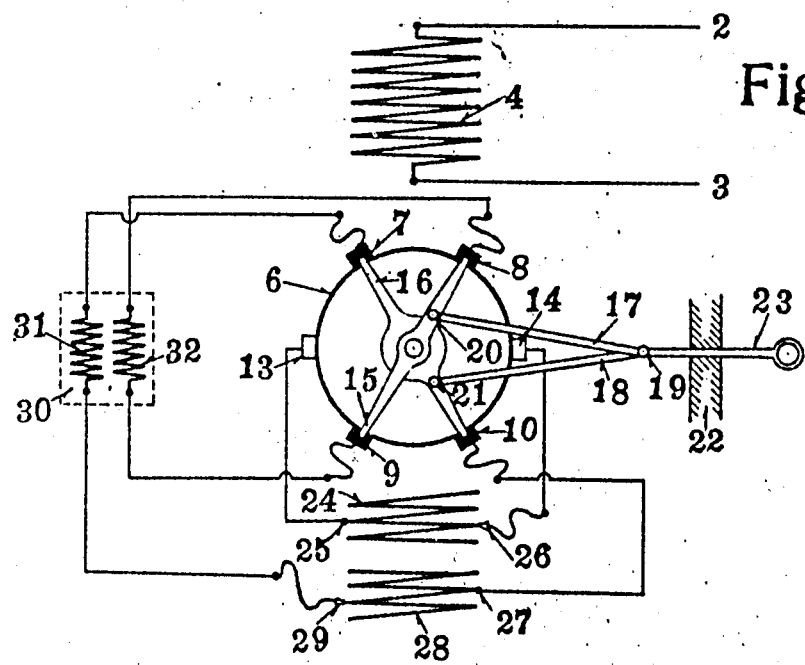

Figure 1 of the accompanying drawings diagrammatically represents a two-pole compensated single-phase shunt induction commutator motor embodying my invention, and provided with two commuted windings on the induced member, while Fig. 2 shows a similar machine with but one commuted winding on the induced member.

The stator carries a main inducing winding 4 connected to the mains 2, 3, and also two coaxial auxiliary windings 24 and 28, the first being a phase compensating, the second a speed regulating, winding. The rotor is provided with two commuted windings 5, 6, each provided with a commutator. These two commuted windings are connected in series along the motor field axis by means of the brushes 11, 12, coöperating with the winding 5, and the brushes 13, 14 coöperating with the winding 6, and a compensating E. M. F. derived from the stator winding 24 is introduced into this circuit by connecting brush 11 to a fixed point 25 somewhere about the middle of the winding 24 and brush 14 to some other point of the same winding by means of the movable contact 26. By means of this connection it is possible to vary the magnitude of the compensating E. M. F. and to change its direction. The working circuit through the two commuted windings is formed by means of the working brushes 8, 9, coöperating with the winding 5, and 7, 10 coöperating with the winding 6. In the figure the brushes 8, 9 are adapted to close the winding 5 along an axis displaced in a clockwise direction by 30 degrees from that of the main inducing winding 4, while the brushes 7, 10 are adapted to close the winding 6 along an axis displaced by 30 degrees from that of 4 in a counter clockwise direction. The brushes 8 and 9 are insulatingly supported on the arm 15 pivoted concentrically with the motor shaft, and the brushes 7, 10 are insulatingly supported by the similarly pivoted arm 16. Both arms are controlled by the rod 23, which can be moved longitudinally in the fixed support 22 and which is connected to the rocker arms 15, 16 by means of the links 17, 18 pivoted at 19, 20 and 21. A movement of the rod 23 to the right will increase the angles by which the rocker arms 15 and 16 are displaced from the axis 4. An opposite movement of this rod will decrease these angles. In any case the angle by which one rocker arm is displaced from the axis of 4, will always be the same as that by which the other arm is displaced from that same axis. The working brushes connect the two rotor commuted windings in series, brush 7 being connected to the brush 9, and an E. M. F. of the same phase as that impressed on the main inducing winding 4 is conductively impressed on this rotor circuit, being derived from the speed regulating winding 28 by connecting the brush 10 to a point 27 somewhere near the middle of the winding 28, and the brush 8 to some other point of said winding by means of the movable contact 29. This connection permits the magnitude of this E. M. F. to be varied and its direction changed with respect to that of the rotor working E. M. F.

In operating this machine for the purpose of adjusting its speed, it is possible to secure a wide speed range by simply manipulating the rod 23, that is, by displacing the working brushes more or less from the axis of the main inducing winding while impressing an alternating current E. M. F. of constant magnitude on the rotor working circuit controlled by the movable brushes. A better utilization of the rotor copper can, however, be secured by also changing the magnitude of the E. M. F. conductively impressed on the rotor working circuit, particularly at speeds considerably below the synchronous. While thus regulating the speed of the machine, its power factor can be adjusted by adjusting the magnitude of the compensating E. M. F. derived from the winding 24 and impressed on the field circuit of the rotor. The main inducing winding 4, statically induces in each of the rotor commuted windings an E. M. F. the maximum value of which appears along an axis coinciding with that of 4. Along any other axis only part of the total induced E. M. F. is available. These statically induced E. M. F.'s represent the working E. M. F.'s in each of these commuted windings. The whole or any part of these E. M. F.'s can be connected in series by means of brushes, as in the example shown. Their sum is the total working E. M. F. of the rotor, and its value depends on the angular displacement of the brush axes from the axis of 4. Assuming that the brushes 8, 9, as well as the brushes 7, 10, are located in the axis of 4 and connected in series, then the total working E. M. F. for a given terminal voltage is a maximum. The speed of the machine will be a nearly synchronous one if the brush circuit is short circuited, but it will differ from the synchronous as soon as a regulating E. M. F. of same phase as that impressed on 4 is conductively introduced into the brush circuit. If this E. M. F. is of the same direction as that statically induced in the rotor by the primary winding 4, then the speed of the motor will be raised above synchronism. If the direction of the regulating E. M. F. opposes that of the induced working E. M. F., then the speed of the motor will be reduced below the synchronous, the change in speed depending on the ratio between the working E. M. F. statically induced in the rotor and the regulating E. M. F. conductively introduced into it. As long as the working brushes stand in the axis of 4, the maximum value of the E. M. F.'s statically induced by 4 in the commuted windings 5 and 6 appears at these brushes. As soon as they are moved so as to contact with the commuted windings along an axis forming an angle with that of 4, only parts of the E. M. F.'s statically induced in the rotor appear at these brushes and by displacing the brushes in the manner shown, I therefore decrease the effective rotor working E. M. F. and am thus able to vary the speed of the motor, provided I, at the same time, impress a regulating E. M. F. on this circuit and even if I keep same constant.

It will be readily seen from the above explanation that it is not necessary to move both sets of working brushes, but I nevertheless prefer to do so, and when moving both of them I prefer to displace them to equal extents from the axis of the main inducing winding. If only one set of working brushes is moved, or if when both are moved they are not displaced to the same extent, then the rotor working currents will produce a magnetization along the field axis of the machine, and this leads to unwelcome complications.

While the rotor copper is best utilized by making use of both commuted windings for the purpose of producing the motor field, yet the latter can be produced with the help of one of the windings only.

It will also be understood that it is immaterial just how the regulating or the compensating E. M. F. is obtained just so each of these has about the same phase as that impressed on the main inducing winding.

Referring to Fig. 2, the stator carries a main inducing winding 4 and two coaxial auxiliary windings 24, 28 of which 24 is the compensating and 28 the speed regulating winding. The rotor, carries one commuted winding 6, one set of exciting brushes 13, 14 displaced by 90 electrical degrees from the axis of 4 and two sets of working brushes 7, 10 and 8, 9. The brushes 7, 10 are insulatingly carried by the movable brushrocker arm 16 and the brushes 8, 9 are similarly carried by the movable brushrocker arm 15. Each brush set is shown displaced by 30 degrees in opposite directions from the axis of the inducing winding 4. This displacement can be reduced or increased by means of the controlling lever 23 guided in the support 22 and connected to the brushrocker arms by the links 17, 18 pivoted at 19, 20, 21. The rotor working circuit comprising the brushes 8, 9 is connected in series relation with the rotor working circuit 7, 10 by means of the series transformer 30, one winding 32 of which is in circuit with the first, while its winding 31 is in circuit with the second set of working brushes, and also with the regulating winding 28 which is so connected that the magnitude of the regulating E. M. F. can be varied and its direction changed with respect to the other working E. M. F. The exciting brushes are connected to the compensating winding 24 in such a way that the magnitude of the E. M. F. derived from this winding can be varied and its direction changed. To change the speed of this machine when a regulating E. M. F. of a certain value is conductively impressed on its rotor working circuits it is only necessary to move the lever 23 in one or the other direction. Another range of speeds can be secured by reversing the direction of the regulating E. M. F. without changing its magnitude. Other ranges of speed can be secured by changing the magnitude of the regulating E. M. F.

Having fully described my invention, what I claim as new and desire to secure by Letters Patent of the United States is:

1. In an alternating current motor, the combination of an inducing member, an induced member, means for establishing two angularly displaced working circuits through the induced member, means for changing the angle betwen the axes of said circuits, and means for conductively supplying an E. M. F. to each of said circuits.

2. In an alternating current motor, the combination of an inducing member, an induced member, means for establishing two angularly displaced working circuits through the induced member, means for simultaneously shifting the axes of the working circuits to equal extents and in opposite directions, and means for conductively supplying an E. M. F. to each or said circuits.

3. In an alternating current motor, the combination of an inducing member, an induced member, means for establishing an exciting circuit and two angularly displaced working circuits through the induced member, means for changing the angle between the axes of said working circuits, and means for conductively supplying an E. M. F. to each of said circuits.

4. In an alternating current motor, the combination of an inducing member, an induced member, means for establishing an exciting circuit and two working circuits through the induced member, the working circuits being angularly displaced in opposite directions and to an equal extent from the axis of the magnetization produced by the inducing member, means for changing the angle between the axes of said circuits, and means for conductively supplying an E. M. F. to each of said circuits.

5. In an alternating current motor, the combination of an inducing member, an induced member, means for establishing two angularly displaced working circuits through the induced member connected in series relation, means for simultaneously shifting the axes of the working circuits to equal extents and in opposite directions, and means for conductively supplying an E. M. F. to each of said circuits.

6. In an alternating current motor, the combination of an inducing member, an induced member, means for establishing two working circuits through the induced member each angularly displaced to an equal extent from the axis of the magnetization produced by the inducing member, means for establishing an exciting circuit through the induced member along the axis displaced by 90 electrical degrees from the axis of said magnetization, means for changing the angle between the axes of the working circuits, and means for conductively supplying an E. M. F. to each of said circuits.

7. In an alternating current motor, the combination with an inducing member, of an induced member provided with two sets of working brushes, each set of brushes being positioned at an angle to the magnetization produced by the inducing member, means for simultaneously shifting the axes of both sets of working brushes to equal extents and in opposite directions, and means for conductively supplying an E. M. F. to each set of working brushes.

8. In an alternating current motor, the combination of an inducing member, an induced member, means for establishing an exciting circuit and two angularly displaced working circuits through the induced member, means for changing the angle between the axes of said working circuits, means for conductively supplying an E. M. F. to each of said circuits, and means for varying the magnitude of said E. M. F.'s.

9. In an alternating current motor, the combination with an inducing member, of an induced member provided with a commuted winding, exciting brushes and two sets of working brushes coöperating with said winding, each set of working brushes being positioned at an angle to the magnetization produced by the induced member, means for simultaneously shifting the axes of both sets of working brushes to equal extents and in opposite directions, and means for conductively supplying an E. M. F. to each set of working brushes.

10. In an alternating current motor, the combination with an inducing member, of an induced member provided with a commuted winding, exciting brushes and two sets of working brushes coöperating with said winding, each set of working brushes being positioned at an angle to the magnetization produced by the induced member, and connected in series relation, means for simultaneously shifting the axes of both sets of working brushes to equal extents and in opposite directions, and means for conductively supplying an E. M. F. to each set of working brushes.

11. In an alternating current motor, the combination with an inducing member, of an induced member provided with a commuted winding, exciting brushes and two sets of working brushes coöperating with said winding, each set of working brushes being positioned at an angle to the magnetization produced by the inducing member, means for simultaneously shifting the axes of both sets of working brushes to equal extents and in opposite directions, means for conductively supplying an E. M. F. to each set of working brushes, and means for impressing a compensating E. M. F. on the exciting brushes.

12. In an alternating current motor, the combination with an inducing member, of an induced member provided with a commuted winding, exciting brushes and two sets of working brushes coöperating with said winding, each set of working brushes being positioned at an angle to the magnetization produced by the induced member and connected in series relation, means for simultaneously shifting the axes of both sets of working brushes to equal extents and in opposite directions, means for conductively supplying an E. M. F. to each set of working brushes, means for varying the magnitude of said E. M. F., and means for impressing a compensating E. M. F. on the exciting brushes.

13. In an alternating current motor, the combination of an inducing member, an induced member, means for establishing two angularly displaced working circuits through the induced member, means for simultaneously shifting the axes of the working circuits to equal extents and in opposite directions, and means for conductively supplying to each of said circuits an E. M. F. substantially cophasal with the E. M. F. impressed on the inducing member.

In testimony whereof, I have hereunto set my hand and affixed my seal.

VALERE A. FYNN. [L. S.]